(12) United States Patent
Rose (10) Patent No.: US 6,175,208 B1
(45) Date of Patent: Jan. 16, 2001

(54) HIGH EFFICIENCY PERMANENT SPLIT CAPACITOR MOTOR FOR DRIVING A COMPRESSOR

(75) Inventor: J. Scott Rose, Alton, IL (US)

(73) Assignee: Emerson Electric Co., St. Louis, MO (US)

( * ) Notice: Under 35 U.S.C. 154(b), the term of this patent shall be extended for 0 days.

(21) Appl. No.: 09/409,652

(22) Filed: Oct. 1, 1999

(51) Int. Cl.$^7$ ...................................................... H02P 1/44
(52) U.S. Cl. ........................ 318/751; 318/779; 318/774; 318/775; 318/767; 318/772; 318/817; 310/254
(58) Field of Search ...................................... 318/751, 779, 318/774, 775, 767, 772, 817; 310/254

(56) References Cited

U.S. PATENT DOCUMENTS

| | | |
|---|---|---|
| 1,795,063 | 3/1931 | Weichsel . |
| 1,859,368 | 5/1932 | Kennedy . |
| 1,859,369 | 5/1932 | Kennedy . |
| 2,813,239 | 11/1957 | Cour ........................................ 318/221 |
| 2,896,144 | 7/1959 | Mollenberg ............................ 318/224 |
| 3,619,730 | 11/1971 | Broadway ......................... 318/224 R |
| 3,826,960 | 7/1974 | Broadway et al. ................... 318/223 |
| 4,103,212 | 7/1978 | Spradling ............................ 318/224 A |
| 4,103,213 | 7/1978 | Landgraf ............................. 318/224 A |
| 4,322,665 | 3/1982 | Landgraf ................................. 318/774 |
| 4,352,051 | 9/1982 | Johnson ................................. 318/790 |
| 4,476,422 | 10/1984 | Kirschbaum ........................... 318/776 |
| 4,937,513 | * 6/1990 | Hoemann et al. ..................... 318/772 |
| 5,166,568 | * 11/1992 | Nystuen et al. ....................... 310/254 |
| 5,345,126 | * 9/1994 | Bunch .................................... 318/783 |
| 5,611,674 | 3/1997 | Bass et al. ............................. 417/220 |
| 5,613,841 | 3/1997 | Bass et al. ............................. 417/310 |
| 5,678,985 | 10/1997 | Brooke et al. ......................... 417/299 |
| 5,741,120 | 4/1998 | Bass et al. ........................... 417/44.2 |
| 5,825,111 | 10/1998 | Fei ........................................ 310/179 |

* cited by examiner

*Primary Examiner*—Karen Masih
(74) *Attorney, Agent, or Firm*—Senniger, Powers, Leavitt & Roedel (57) ABSTRACT

A permanent split capacitor motor operable in a full mode and in a modulated mode for improving efficiency. The motor includes a stator and a rotor in rotational relationship with the stator. The motor also includes a single set of windings wound on the stator. The windings are in a magnetically coupled relationship with each other such that one of the windings is a main motor winding while the other is an auxiliary motor winding. The windings define a plurality of A-ratios as a function of turns in the main motor winding compared to turns in the auxiliary motor winding. A switching circuit selectively energizes the first and second windings in a full mode configuration and in a modulated mode configuration based on motor load conditions. In the full mode configuration, the A-ratio of the windings is greater than in the modulated mode configuration.

37 Claims, 5 Drawing Sheets

HIGH EFFICIENCY PERMANENT SPLIT CAPACITOR MOTOR FOR DRIVING A COMPRESSOR

BACKGROUND OF THE INVENTION

The invention generally relates to permanent split capacitor single phase induction motors and, particularly, to a permanent split capacitor motor having a full capacity mode and a modulated capacity mode for improving operating efficiency.

A permanent split capacitor (PSC) motor of the type described herein has a stator assembly forming a core of magnetic material. Typically, the core consists of a stack of laminations punched from sheet-like ferro-magnetic material. Each lamination has a plurality of teeth spaced around a central opening and extending radially inwardly. When the laminations are stacked, the central openings are coaxial and constitute a bore extending longitudinally through the core. The bore receives a rotor assembly (e.g., a squirrel cage rotor) made from a stack of rotor laminations. A slip between the rotation of the rotor and the rotation of a magnetic field created by the stator induces a current in the rotor. In turn, the induced current creates a magnetic field of the rotor in contrast to the magnetic field of the stator. These contrasting rotating magnetic fields cause rotating torque of the rotor. Such a motor is particularly useful for driving a compressor of a refrigeration or air conditioning system. In this instance, the rotor has a bore for receiving a hermetic compressor crankshaft that rotatably supports the rotor body within the stator bore.

The rising cost of energy, the heightened awareness of environmental issues and the attendant governmental regulations for appliances and the like have all tended to accentuate the ongoing need for efficient and economical motors. As described above, single phase induction motors, including PSC motors, are frequently used as part of refrigeration and air conditioning systems for driving hermetically sealed compressors. In such systems, proper sizing of the equipment seeks to improve efficiency for operation over a wide range of load conditions. However, it is difficult to provide ample capacity and efficient operation for peak load conditions while still operating efficiently at lighter load conditions.

In general, the efficiency of a compressor motor involves the ratio of running load torque to breakdown torque. A ratio of about 3.0 (breakdown torque/running load torque) is desired for a relatively high efficiency for running load while still meeting the low voltage run down loaded requirements. The Air conditioning and Refrigeration Institute (ARI) sets forth standard test procedures for evaluating compressor efficiency. The test procedures examine the compressor's performance at standard conditions of 45° F. evaporating and 130° F. condensing temperature. Present government guidelines for energy efficiency reference ARI standards. In addition, compressor performance may be measured at operating conditions more closely approximating the actual operating conditions of a high efficiency system. For example, Copeland Corporation evaluates the performance of its compressors according to a standard referred to as "CHEER." The CHEER standard rates compressor performance at 45° F. evaporating, 100° F. condensing temperature; 85° F. liquid; 65° F. return gas. Since the CHEER rating conditions more closely approximate the conditions under which the compressor will operate most frequently, higher compressor efficiency at CHEER generally equates to lower operating cost.

One method for modulating the compressor of the refrigeration system involves operating the compressor at two distinct speeds. However, multiple speed motors often cost more than single speed motors and/or fail to provide sufficient operating torque at low speeds. As an example, distinct winding multiple speed motors require separate main and auxiliary windings for each motor speed, which can increase the cost of the motor and present problems with respect to slot fill.

Since the motor is enclosed and hermetically sealed within the compressor unit in such a system, the number of leads from the motor is another cost factor. Electrical connections are made through the shell of the compressor and special connectors are needed to preserve the hermetic seal. The use and insertion of the connectors in the shell add significantly to the cost of the compressor. Consequently, motors designed for use in hermetic compressors should incorporate a minimum number of leads so as to minimize construction problems and the cost inherent in making multiple electrical connector openings through the compressor shell.

For these reasons, a motor is desired for reducing breakdown torque and improving efficiency over a wide operating range from peak load conditions to lightly loaded conditions. Further, such a motor is desired that does not require a large number of leads.

Commonly assigned U.S. Pat. No. 4,322,665, U.S. Pat. No. 4,103,212 and U.S. Pat. No. 4,103,213, the entire disclosures of which are incorporated herein by reference, disclose single phase motors that may be used for driving compressors.

SUMMARY OF THE INVENTION

The invention meets the above needs and overcomes the deficiencies of the prior art by providing an improved PSC motor system. Among the several objects and features of the present invention may be noted the provision of such a motor system that permits high efficiency operation over a wide range of load conditions; the provision of such a motor system that permits operation in a full capacity mode and in a modulated capacity mode; the provision of such a motor system that permits reducing breakdown torque in a modulated capacity mode; the provision of such a motor system that permits electrical connections using a minimum number of leads; the provision of such a motor system that permits unidirectional rotation for driving a compressor; and the provision of such method that can be carried out efficiently and economically and such system that is economically feasible and commercially practical.

Briefly described, a permanent split capacitor motor embodying aspects of the invention is operable in a full mode and in a modulated mode. The motor includes a stator and a rotor in rotational relationship with the stator. The motor also includes first and second windings wound on the stator. The windings are in a magnetically coupled relationship with each other such that one of the windings is a main motor winding while the other is an auxiliary motor winding. The windings define an A-ratio as a function of turns in the main motor winding compared to turns in the auxiliary motor winding. The motor further includes a switching circuit for selectively energizing the first and second windings in a full mode configuration and in a modulated mode configuration based on motor load conditions. In a preferred embodiment, the A-ratio of the windings energized in the full mode configuration is greater than the A-ratio of the windings energized in the modulated mode configuration. In this manner, the motor is selectively operable in the full and modulated modes based on motor load conditions for improving efficiency.

In another embodiment, a permanent split capacitor having a stator and a rotor in rotational relationship with the stator is operable in a full mode and in a modulated mode. The motor includes first and second windings wound on the stator in a magnetically coupled relationship with each other. The first winding generates a first rotating main magnetic field and the second winding generates a first rotating auxiliary magnetic field when the windings are energized in a full mode configuration for rotating the rotor. On the other hand, the second winding generates a second rotating main magnetic field and the first winding generates a second rotating auxiliary magnetic field when the windings are energized in a modulated mode configuration different from the full mode configuration for rotating the rotor. The motor also includes a switching circuit for selectively energizing the windings in the full mode configuration and in the modulated mode configuration based on motor load conditions. In this manner, the motor is selectively operable in the full and modulated modes based on motor load conditions for improving efficiency.

Another embodiment of the invention is directed to an improved compressor with a drive shaft driven by a permanent split capacitor motor. The motor has a stator wound with first and second windings and a rotor in rotational relationship with the stator. In addition, the rotor is in driving relation with the shaft. The improvement includes the first winding generating a first rotating main magnetic field and the second winding generating a first rotating auxiliary magnetic field when the windings are energized in a full mode configuration for rotating the rotor. The motor operates in a full mode for driving the compressor when the windings are energized in the full mode configuration. The improvement also includes the second winding generating a second rotating main magnetic field and the first winding generating a second rotating auxiliary magnetic field when the windings are energized in a modulated mode configuration different from the full mode configuration for rotating the rotor. In the instance, the motor operates in a modulated mode for driving the compressor when the windings are energized in the modulated mode configuration. The improvement further includes a switching circuit for selectively energizing the windings in the full mode configuration and in the modulated mode configuration based on motor load conditions. In this manner, the motor is selectively operable in the full and modulated modes based on motor load conditions for improving efficiency.

In yet another embodiment, a permanent split capacitor motor embodying aspects of the invention includes a stator and a rotor in rotational relationship with the stator. A single set of windings are wound on the stator. The set of windings includes a main motor winding and an auxiliary motor winding different from the main winding. The main and auxiliary motor windings are in a magnetically coupled relationship with each other and define a plurality of A-ratios as a finction of turns in the main motor winding compared to turns in the auxiliary motor winding.

Another embodiment of the invention is directed to a method of improving efficiency in a permanent split capacitor motor. The motor has a stator and a rotor, the rotor being in rotational relationship with the stator. The method includes the steps of winding a first winding on the stator and winding a second winding different from the first winding on the stator. The method also includes selecting one winding as a main motor winding and selecting the other winding as an auxiliary motor winding. The windings define an A-ratio as a function of turns in the main motor winding compared to turns in the auxiliary motor winding. The method further includes the step of selectively energizing the first and second windings in a full mode configuration and in a modulated mode configuration based on motor load conditions. In a preferred embodiment, the A-ratio of the windings energized in the full mode configuration is greater than the A-ratio of the windings energized in the modulated mode configuration. In this manner, the motor is selectively operable in the full and modulated modes based on motor load conditions for improving efficiency.

Alternatively, the invention may comprise various other methods and systems.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
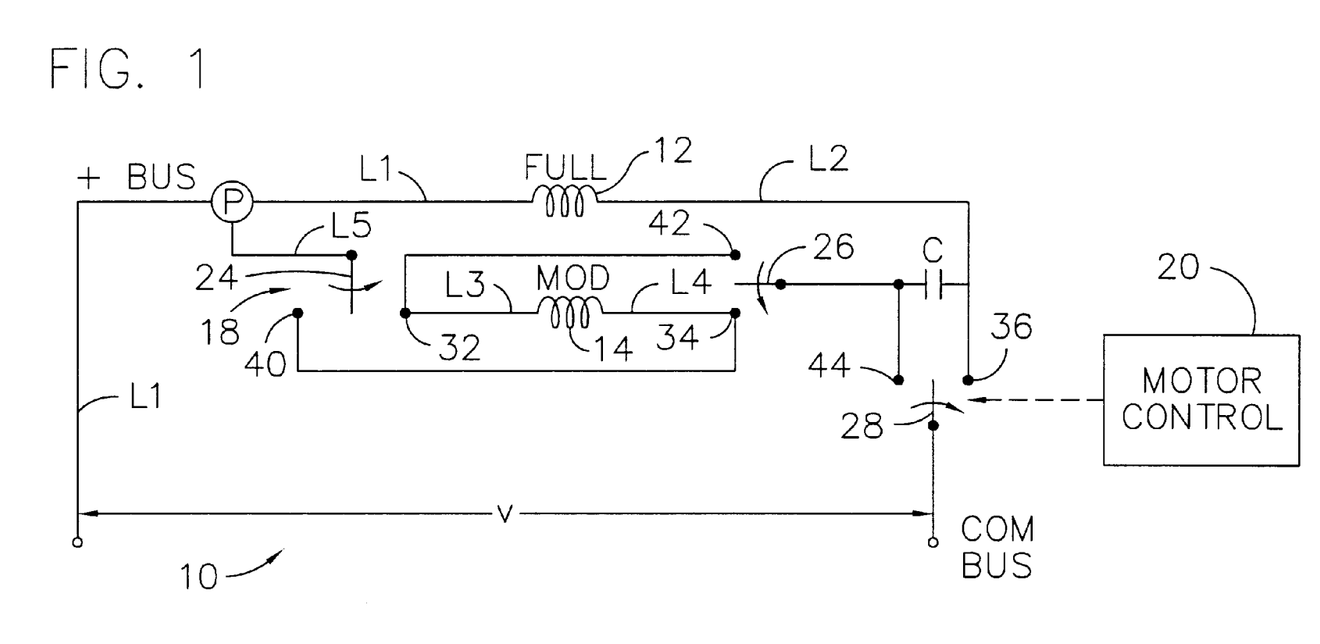
FIG. 1 is a schematic diagram a permanent split capacitor motor according to a preferred embodiment of the present invention.

Referring now to the drawings, FIG. 1 illustrates a PSC motor, generally indicated at 10, in schematic diagram form. In one preferred embodiment of the invention, the motor 10 drives a compressor (see FIGS. 2A and 2B), which is part of a refrigeration or air conditioning system. Copeland Corporation manufactures a number of scroll compressors suitable for use with the present invention. These Copeland compressors are covered by one or more of the following patents: U.S. Pat. No. 5,741,120, U.S. Pat. No. 5,678,985, U.S. Pat. No. 5,613,841 and U.S. Pat. No. 5,611,674, the entire disclosures of which are incorporated herein by reference. As an example, Copeland sells a 2.75 HP scroll compressor under the trademark Quantum™ (model number ZRS34K3-PFV) that provides high efficiency operation when driven by motor 10 of the present invention. While the invention is described with particular detail in reference to motors used in hermetic compressor applications, those skilled in the art will recognize the wider applicability of the inventive principles disclosed herein.

According to the invention, motor 10 advantageously provides full and modulated modes of operation. In the full mode, motor 10 provides high efficiency operation for driving full loads and in the modulated mode, motor 10 provides high efficiency operation for driving relatively lighter loads. As shown in FIG. 1, motor 10 includes a first winding 12 and a second winding 14 wound on its stator.

Those skilled in the art recognize that the windings 12, 14 are connected to each other and to a continuous rated capacitor C for producing a rotating torque on the rotor when energized. The first winding 12, also referred to as a full mode winding, functions as the PSC motor's main winding and the second winding 14 functions as its auxiliary winding when motor 10 operates in the full mode. Conversely, second winding 14, also referred to as a modulated mode winding, functions as the main winding and first winding 12 functions as the auxiliary winding when motor 10 operates in the modulated mode.

FIG. 1 further illustrates a switching circuit, generally indicated at 18, for switching operation of motor 10 between its full and modulated modes. For example, the switching circuit 18 comprises a triple pole, double throw switch responsive to a motor control circuit 20 for switching modes. In the alternative, switching circuit 18 comprises three, single pole, double throw switches. Switching circuit 18 is conventional and may be any one of a variety of commercially available switches. Therefore, its structure and operation are not described in detail. For simplicity, FIG. 1 illustrates switching circuit 18 as individual switching elements 24, 26, 28.

When full capacity is desired, the motor control circuit 20 causes the switch 24 to connect node 32 to the circuit's positive power bus and the switch 26 to connect node 34 to the capacitor C. In addition, the switch 28 connects node 36 to the circuit's common bus. This configuration orients full mode winding 12 as the main winding of motor 10 relative to the auxiliary winding 14. Similarly, the motor control circuit 20 causes switching circuit 18 to alternate its positions when modulated capacity is desired. In the modulated mode, switch 24 connects node 40 to the circuit's positive power bus, switch 26 connects node 42 to capacitor C and switch 28 connects node 44 to the circuit's common bus. This configuration orients modulated mode winding 14 as the main winding of motor 10 relative to the auxiliary winding 12. Switching the main and auxiliary windings generally reverses a motor's direction of rotation. However, in a scroll compressor application, for example, rotation must remain unidirectional. Advantageously, motor 10 provides correct rotation for the compressor in both full and modulated modes.

Figure 2A:
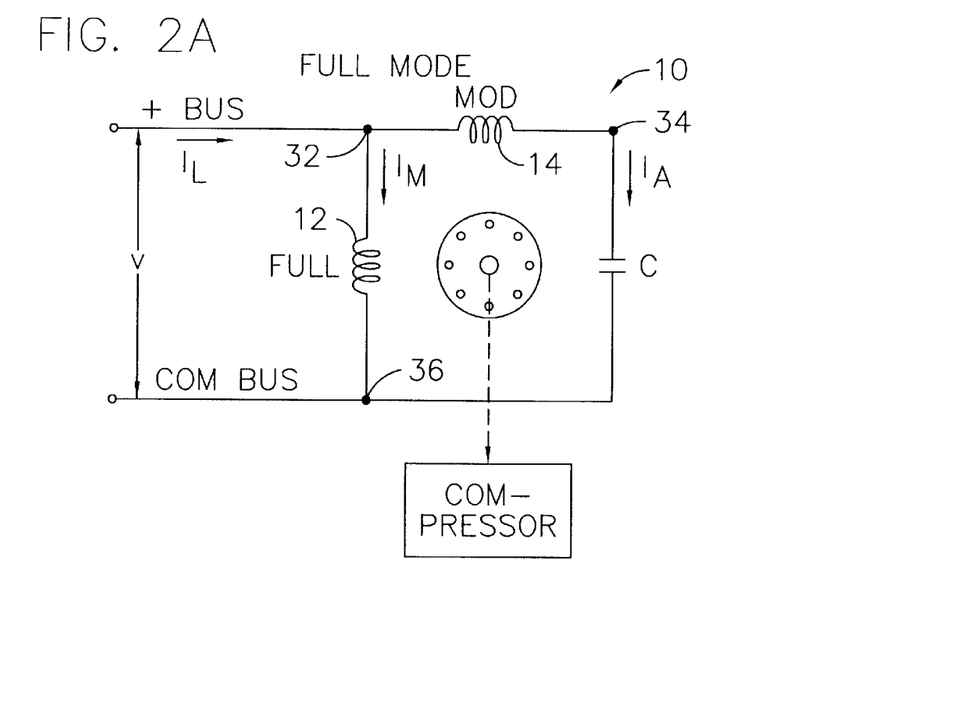
FIGS. 2A and 2B are schematic models of the motor of FIG. 1 operating in a full capacity mode and a modulated capacity mode, respectively.
Figure 2B:
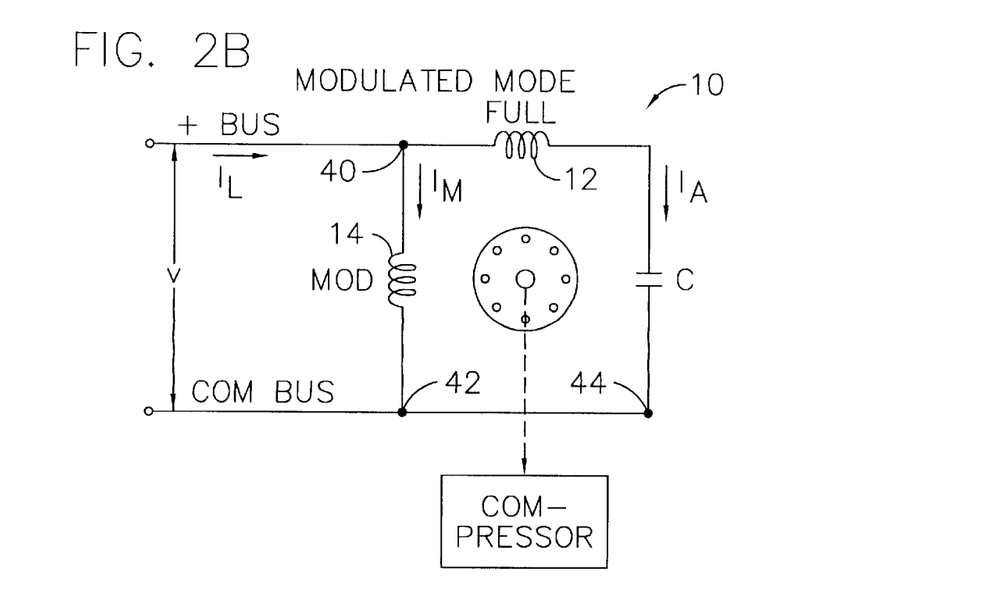

FIG. 2A provides a diagrammatic model of motor 10 in the full mode and FIG. 2B provides a diagrammatic model of motor 10 in the modulated mode. In FIGS. 2A and 2B, the load current $I_L$, the main winding current $I_M$ and the auxiliary winding current $I_A$ are each indicated with respect to first and second windings 12, 14 and capacitor C.

Figure 3:
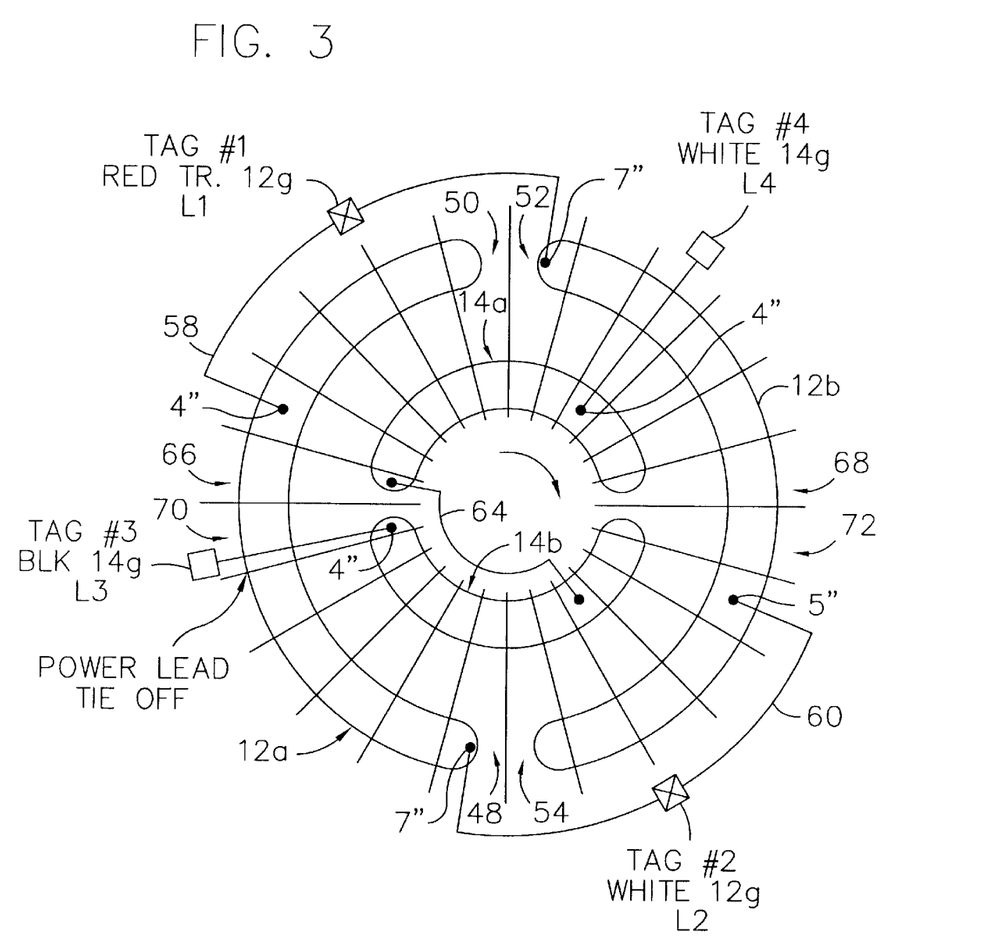
FIG. 3 is a diagrammatic view of the winding distribution of one preferred embodiment of the motor of FIG. 1.

FIG. 3 diagrammatically illustrates the stator of motor 10 in an exemplary two pole configuration. Those skilled in the art recognize that the stator of motor 10 has a plurality of radial teeth spaced at approximately equal angular intervals and extending into the stator's central bore. In FIG. 3, the stator teeth are shown as radial lines. Each pair of adjacent teeth defines a slot in between the teeth for holding windings 12, 14. As an example, the illustrated stator has 24 teeth defining 24 slots although other stator assemblies having a different number of teeth and slots may be utilized in accordance with this invention.

Referring further to FIG. 3, first winding 12 comprises two coil sets or physical winding poles 12a, 12b. In a preferred embodiment of the invention, a plurality of turns of suitable magnet wire or the like make up the coil sets 12a, 12b. Coil sets 12a, 12b are inserted in selected stator slots so that they are generally on opposite sides of the stator bore from one another. As an example, an outer coil of coil set 12a is inserted in slots 48, 50 with inner coils being inserted in selected slots between slot 48 and slot 50. Likewise, an outer coil of coil set 12b is inserted in slots 52, 54 with inner coils being inserted in selected slots between slot 52 and slot 54. FIG. 3 illustrates an exemplary connection in which coil sets 12a, 12b are connected electrically in parallel with each other by jumpers 58, 60.

Second winding 14 is likewise inserted in selected slots of the stator core, having two coil sets 14a, 14b that are generally on opposite sides of the stator bore from one another. In this instance, coil sets 14a, 14b are connected electrically in series with each other by a jumper 62. An outer coil of coil set 14a is inserted in slots 66, 68 with inner coils being inserted in selected slots between slot 66 and slot 68 and an outer coil of coil set 14b is inserted in slots 70, 72 with inner coils being inserted in selected slots between slot 70 and slot 72.

As an example, first winding 12 consists of a single strand of #17.25 copper wire having 16-23-32-46-46 turns wound over 3, 5, 7, 9 and 11 teeth, respectively, and second winding 14 consists of a single strand of #18.00 copper wire having 15-25-25-31 turns wound over 5, 7, 9 and 11 teeth, respectively. Motor 10 constructed in this manner with a 3.500 inch stack height has clockwise lead end rotation and a synchronous speed of 3600 rpm and puts out approximately 2.75 horsepower when energized by single phase, 60 Hz, alternating current. It is to be understood that motor 10 may be constructed with a variety of internal coil connections.

In the embodiment of FIG. 3, motor 10 uses four leads L1–L4 for electrical connections. As shown, leads L1 and L2 are located on opposite sides of first winding 12 and leads L3 and L4 are located on opposite sides of second winding 14. It is to be understood that an additional lead is used if motor 10 includes a protector circuit P (see FIG. 1). If motor 10 includes the protector P, then L1 is moved to the input of protector P and an additional lead L5 (see FIG. 1) provides an electrical connection to motor 10 at switch 24.

As described above, motor 10 is particularly applicable to, but not limited to, hermetically sealed compressor units. Leads L1–L4 are adapted to pass through the compressor shell (or similar structure) in which a hermetic motor of this invention is housed. Those skilled in the art recognize that switching circuit 18 may be connected to leads L1–L4 outside the compressor shell.

In motor design terms, the motor 10 of the present invention provides a variable "A-ratio" to provide optimum performance at both heavy and lightly loaded conditions.

Generally, the A-ratio is the ratio of turns in the main winding to the turns in the auxiliary winding. In addition, the present invention may be applied to a multiple speed motor (e.g., a two speed PSC blower motor) where a reduction of breakdown torque changes the speed at which the fan or blower rotates. The following tables provide exemplary efficiency and breakdown torque data under various operating conditions with respect to A-ratio. In Tables I and II, the first load point (Load PT#1) represents expected load conditions (e.g., CHEER) and the second load point (Load PT#2) represents maximum load conditions (e.g., ARI) conditions. The data exemplifies improved efficiency at lighter load conditions, otherwise unavailable, by operating in the modulated mode. At higher load conditions, when greater torque is required, operating in the full mode provides optimum efficiency.

TABLE I

| 2 Pole Motor with 45 μF Run Capacitor | A-Ratio | Load PT #1 Efficiency (%) | Load PT #2 Efficiency (%) | Breakdown Torque (oz-ft) |
|---|---|---|---|---|
| Full Mode Run Winding | 1.239 | 82.88 | 87.73 | 250.9 |
| Modulated Mode Run Winding | 0.807 | 87.84 | 87.76 | 133.6 |

TABLE II

| 2 Pole Motor with 50 μF Run Capacitor | A-Ratio | Load PT #1 Efficiency (%) | Load PT #2 Efficiency (%) | Breakdown Torque (oz-ft) |
|---|---|---|---|---|
| Full Mode Run Winding | 1.103 | 83.18 | 87.85 | 253.2 |
| Modulated Mode Run Winding | 0.907 | 86.15 | 88.39 | 171.5 |

The following Table III provides further exemplary efficiency and breakdown torque data under various operating conditions.

TABLE III

| 2 Pole Motor with 45 μF Run Capacitor | Unloaded (36 oz-ft) Efficiency (%) | Light Load (58 oz-ft) Efficiency (%) | Heavy Load (80 oz-ft) Efficiency (%) | Breakdown Torque (@ 3000 rpm) (oz-ft) |
|---|---|---|---|---|
| Full Mode Run Winding | 78 (est.) | 86.8 | 88.3 | 244.0 |
| Modulated Mode Run Winding | 88.9 | 88.5 | 84.4 | 135.1 |

Figure 4:
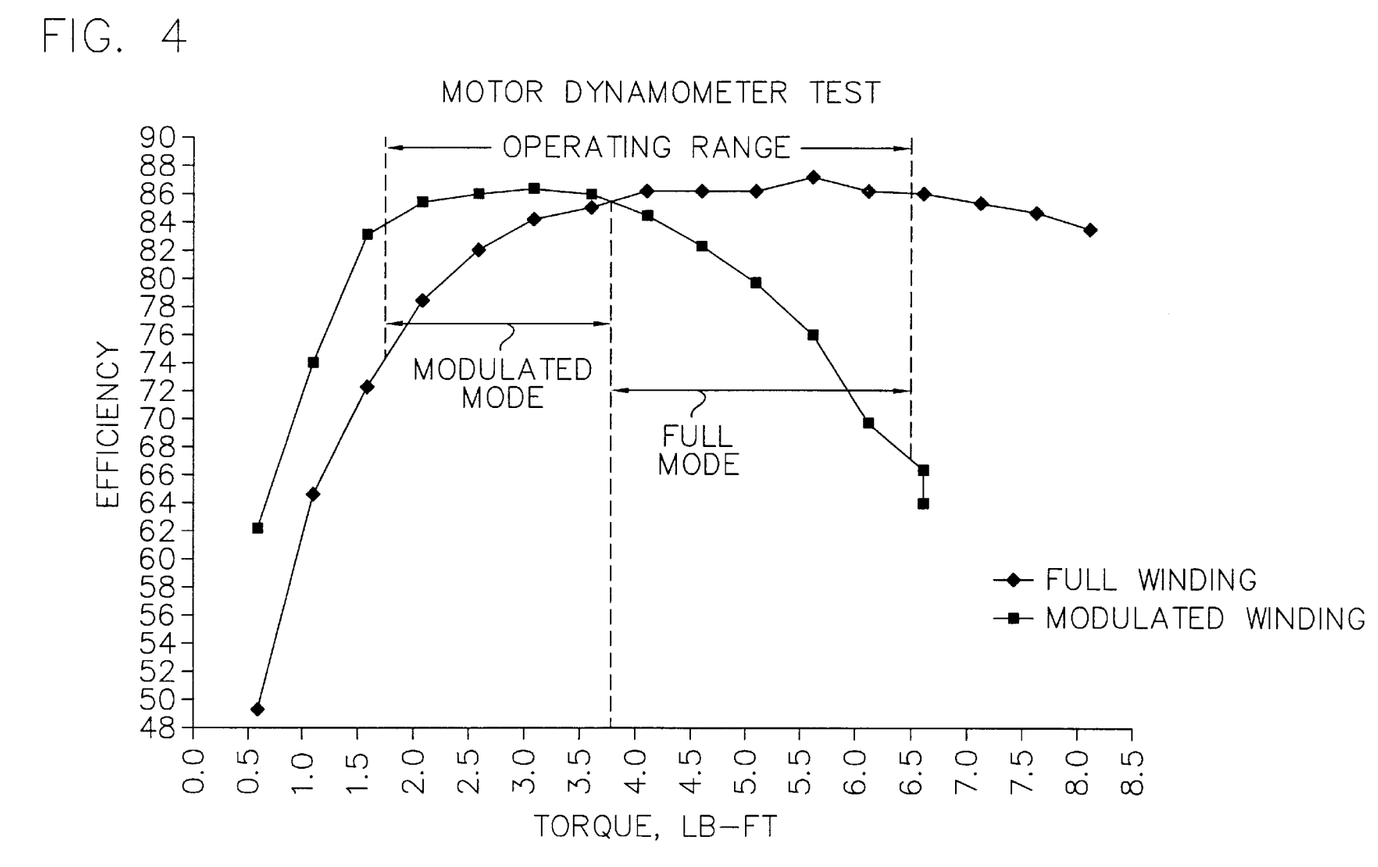
FIG. 4 is a graph illustrating exemplary efficiency and torque data from motor dynamometer test results for the motor of FIG. 1 operating at full capacity and modulated capacity.
Figure 5:
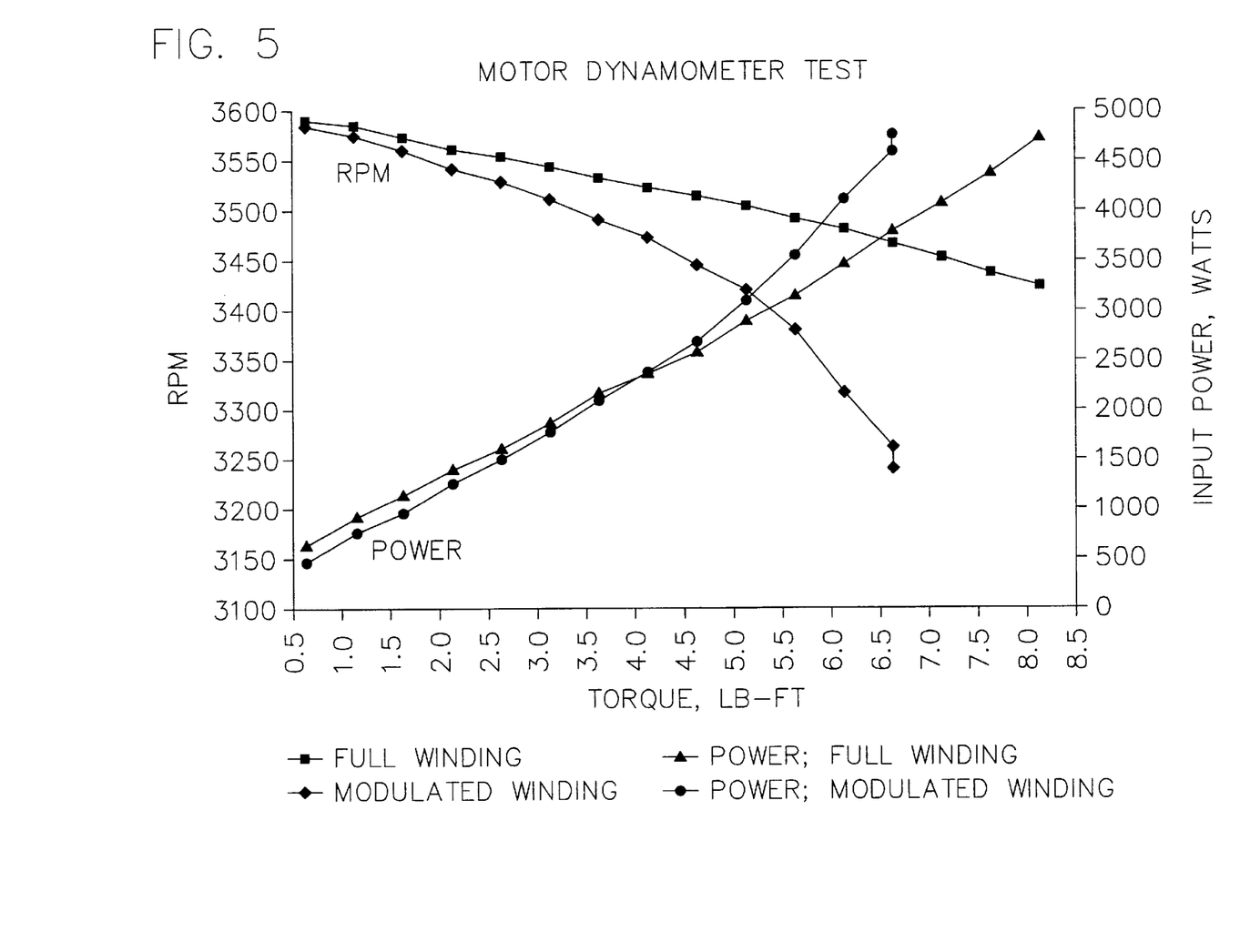
FIG. 5 is a graph illustrating exemplary speed, input power and torque data from motor dynamometer test results for the motor of FIG. 1 operating at full capacity and modulated capacity.

Referring now to FIGS. 4 and 5, exemplary motor dynamometer test results illustrate the efficiency benefits of dual-mode, modulated motor operation. The graph of FIG. 4 reveals an exemplary crossover point of approximately 3.75 lb-ft of torque. At loads below 3.75 lb-ft, motor 10 optimally operates at modulated capacity while, at loads above 3.75 lb-ft, motor 10 optimally operates at full capacity. FIG. 5 illustrates that speed and power characteristics for the two modes are substantially similar.

As an example, motor control circuit 20 generates a signal representative of the amount of torque demanded by the motor load conditions relative to a torque threshold. For example, if the motor load conditions demand torque of 3.75 lb-ft or less, the motor control signal causes switching circuit 18 to energize the windings 12, 14 in the modulated capacity mode.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A permanent split capacitor motor operable in a full mode and in a modulated mode, said motor comprising:
   a stator;
   a rotor in rotational relationship with the stator;
   a first winding wound on the stator and a second winding different from the first winding wound on the stator, said windings being in a magnetically coupled relationship with each other, one of said windings comprising a main motor winding and the other of said windings comprising an auxiliary motor winding, said windings defining an A-ratio as a function of turns in the main motor winding compared to turns in the auxiliary motor winding; and
   a switching circuit for selectively energizing the first and second windings in a fill mode configuration and in a modulated mode configuration based on motor load conditions, the A-ratio of the windings energized in the full mode configuration being greater than the A-ratio of the windings energized in the modulated mode configuration whereby the motor is selectively operable in the full and modulated modes based on motor load conditions for improving efficiency.

2. The motor of claim 1 wherein the rotor rotates in the same direction in the fill mode and the modulated mode.

3. The motor of claim 1 wherein the motor operating in the modulated mode has a lower breakdown torque than the motor operating in the full mode.

4. The motor of claim 1 wherein the A-ratio of the windings is less than 1.0 in the modulated mode.

5. The motor of claim 1 wherein the A-ratio of the windings is greater than 1.0 in the full mode.

6. The motor of claim 1 wherein the first winding comprises the main motor winding and the second winding comprises the auxiliary motor winding in the full mode and wherein the second winding comprises the main motor winding and the first winding comprises the auxiliary motor winding in the modulated mode.

7. The motor of claim 1 further comprising a control circuit, said control circuit generating a motor control signal for controlling the switching circuit, said motor control signal being representative of motor load conditions relative to a torque threshold, said switching circuit receiving and responsive to the motor control signal for energizing the windings in the full mode configuration when the motor load conditions demand torque greater than the torque threshold and in the modulated mode configuration when the motor load conditions demand torque less than or equal to the torque threshold.

8. The motor of claim 1 wherein the switching circuit comprises a plurality of switching elements for selectively connecting the windings to a positive power bus for energizing the windings, a first one of said switching elements being associated with one end of the second winding and a second one of said switching elements being associated with the other end of the second winding for selectively connecting the second winding to the positive power bus.

9. The motor of claim 8 wherein the first and second switching elements operate together for simultaneously reversing the second winding relative to the positive power bus.

10. The motor of claim 8 further comprising a run capacitor connected electrically in series between the first winding and the second switching element and wherein a third one of said switching elements is associated with the capacitor for selectively connecting the capacitor to a common bus.

11. The motor of claim 10 wherein the first, second and third switching elements operate together for simultaneously reversing the second winding relative to the positive power bus and reversing the capacitor relative to the common bus.

12. The motor of claim 1 wherein the switching circuit comprises a triple pole, double throw switch.

13. The motor of claim 1 further comprising a shaft in driving relation with the rotor, said rotor driving a compressor via the shaft.

14. A permanent split capacitor motor operable in a full mode and in a modulated mode, said motor comprising:

a stator;

a rotor in rotational relationship with the stator;

first and second windings wound on the stator in a magnetically coupled relationship with each other, said first winding generating a first rotating main magnetic field and said second winding generating a first rotating auxiliary magnetic field when the windings are energized in a full mode configuration for rotating the rotor, said second winding generating a second rotating main magnetic field and said first winding generating a second rotating auxiliary magnetic field when the windings are energized in a modulated mode configuration different from the full mode configuration for rotating the rotor; and a switching circuit for selectively energizing the windings in the full mode configuration and in the modulated mode configuration based on motor load conditions whereby the motor is selectively operable in the full and modulated modes based on motor load conditions for improving efficiency.

15. A compressor having a drive shaft and a permanent split capacitor motor for driving the compressor via the shaft, said motor having a stator and a rotor in rotational relationship with the stator, said stator having first and second windings wound thereon in a magnetically coupled relationship with each other, said rotor being in driving relation with the shaft, wherein the improvement comprises:

said first winding generating a first rotating main magnetic field and said second winding generating a first rotating auxiliary magnetic field when the windings are energized in a full mode configuration for rotating the rotor, said motor operating in a full mode for driving the compressor when the windings are energized in the full mode configuration;

said second winding generating a second rotating main magnetic field and said first winding generating a second rotating auxiliary magnetic field when the windings are energized in a modulated mode configuration different from the full mode configuration for rotating the rotor, said motor operating in a modulated mode for driving the compressor when the windings are energized in the modulated mode configuration; and a switching circuit for selectively energizing the windings in the full mode configuration and in the modulated mode configuration based on motor load conditions whereby the motor is selectively operable in the full and modulated modes based on motor load conditions for improving efficiency.

16. The compressor of claim 15 wherein the compressor is a scroll-type machine.

17. The compressor of claim 15 wherein the compressor has a variable capacity, said capacity of the compressor determining the motor load conditions.

18. A permanent split capacitor motor comprising:

a stator;

a rotor in rotational relationship with the stator;

a single set of windings wound on the stator, said set of windings comprising a main motor winding and an auxiliary motor winding different from the main winding, said main and auxiliary motor windings being in a magnetically coupled relationship with each other and defining a plurality of A-ratios as a function of turns in the main motor winding compared to turns in the auxiliary motor winding, one of said A-ratios corresponding to a full mode of operation and another one of said A-ratios corresponding to a modulated mode of operation based on motor load conditions.

19. The motor of claim 18 wherein one of the A-ratios is less than 1.0 and another one of the A-ratios is greater than 1.0.

20. The motor of claim 18 wherein the rotor rotates in the same direction in the full mode and the modulated mode.

21. The motor of claim 18 wherein the A-ratio of the motor windings is less than 1.0 in the modulated mode.

22. The motor of claim 18 wherein the A-ratio of the motor windings is greater than 1.0 in the full mode.

23. The motor of claim 18 further comprising a switching circuit for selectively energizing the set of windings in a full mode configuration corresponding to the full mode of operation and in a modulated mode configuration corresponding to the modulated mode of operation based on motor load conditions, the A-ratio of the motor windings energized in the full mode configuration being greater than the A-ratio of the motor windings energized in the modulated mode configuration whereby the motor is selectively operable in the full and modulated modes, respectively, based on motor load conditions for improving efficiency.

24. The motor of claim 23 further comprising a control circuit, said control circuit generating a motor control signal for controlling the switching circuit, said motor control signal being representative of motor load conditions relative to a torque threshold, said switching circuit receiving and responsive to the motor control signal for energizing the set of windings in the full mode configuration when the motor load conditions demand torque greater than the torque threshold and in the modulated mode configuration when the motor load conditions demand torque less than or equal to the torque threshold.

25. A method of improving efficiency in a permanent split capacitor motor, said motor having a stator and a rotor, said rotor being in rotational relationship with the stator, said method comprising the steps of:

winding a first winding on the stator;

winding a second winding different from the first winding on the stator;

selecting one of said windings as a main motor winding;

selecting the other of said windings as an auxiliary motor winding, said windings defining an A-ratio as a function of turns in the main motor winding compared to turns in the auxiliary motor winding; and selectively energizing the first and second windings in a full mode configuration and in a modulated mode configuration based on motor load conditions, the A-ratio of the windings energized in the full mode configuration being greater than the A-ratio of the windings energized in the modulated mode configuration whereby the motor is selectively operable in the full and modulated modes based on motor load conditions for improving efficiency.

26. The method of claim 25 wherein the rotor rotates in the same direction in the full mode and the modulated mode.

27. The method of claim 25 wherein the motor operating in the modulated mode has a lower breakdown torque than the motor operating in the full mode.

28. The method of claim 25 further comprising the step of defining the A-ratio of the windings to be less than 1.0 in the modulated mode.

29. The method of claim 25 further comprising the step of defining the A-ratio of the windings to be greater than 1.0 in the full mode.

30. The method of claim 25 wherein the first winding comprises the main motor winding and the second winding comprises the auxiliary motor winding in the full mode and wherein the second winding comprises the main motor winding and the first winding comprises the auxiliary motor winding in the modulated mode.

31. The method of claim 25 further comprising the steps of comparing torque demanded by the motor load conditions to a torque threshold and generating a motor control signal representative of the comparison for controlling the switching circuit.

32. The method of claim 31 wherein the step of selectively energizing the windings includes energizing the windings in the full mode configuration when the motor load conditions demand torque greater than the torque threshold and energizing the windings in the modulated mode configuration when the motor load conditions demand torque less than or equal to the torque threshold.

33. The method of claim 25 wherein the step of selectively energizing the windings comprises switching the windings relative to a positive power bus using a plurality of switching elements, a first one of said switching elements being associated with one end of the second winding and a second one of said switching elements being associated with the other end of the second winding for selectively connecting the second winding to the positive power bus.

34. The method of claim 33 further comprises the step of operating the first and second switching elements together for simultaneously reversing the second winding relative to the positive power bus.

35. The method of claim 33 wherein the motor includes a run capacitor connected electrically in series between the first winding and the second switching element and wherein a third one of said switching elements is associated with the capacitor for selectively connecting the capacitor to a common bus.

36. The method of claim 35 further comprises the step of operating the first, second and third switching elements together for simultaneously reversing the second winding relative to the positive power bus and reversing the capacitor relative to the common bus.

37. The method of claim 25 wherein the step of selectively energizing the windings comprises switching the windings relative to a positive power bus using a triple pole, double throw switch.

\* \* \* \* \*